United States Patent
Jadhav et al.

(10) Patent No.: US 12,052,993 B2
(45) Date of Patent: *Aug. 6, 2024

(54) AQUEOUS HERBICIDAL INTERMIXTURES

(71) Applicant: UPL LTD, West Bengal (IN)

(72) Inventors: Prakash Mahadeo Jadhav, Lawrenceville, NJ (US); Stephen Skorczynski, Yardley, PA (US); Emily Chiarella, King of Prussia, PA (US); Cody Jack Gray, Peyton, PA (US); Jaidev Rajnikant Shroff, Dubai (AE); Vikram Rajnikant Shroff, Dubai (AE)

(73) Assignee: UPL LTD, Haldia (IN)

( * ) Notice: Subject to any disclaimer, the term of this patent is extended or adjusted under 35 U.S.C. 154(b) by 372 days.

This patent is subject to a terminal disclaimer.

(21) Appl. No.: 16/423,400

(22) Filed: May 28, 2019

(65) Prior Publication Data

US 2019/0357539 A1  Nov. 28, 2019

Related U.S. Application Data

(60) Provisional application No. 62/728,211, filed on Sep. 7, 2018.

(30) Foreign Application Priority Data

May 25, 2018 (IN) .............................. 201831019681

(51) Int. Cl.
*A01N 57/20* (2006.01)
(52) U.S. Cl.
CPC .................................... *A01N 57/20* (2013.01)
(58) Field of Classification Search
CPC ......... A01N 25/02; A01N 25/08; A01N 59/26
See application file for complete search history.

(56) References Cited

U.S. PATENT DOCUMENTS

| 6,642,177 | B1 | 11/2003 | Crudden et al. | |
| 10,888,095 | B2 * | 1/2021 | Bhoge | A01N 57/20 |
| 10,925,280 | B2 * | 2/2021 | Talati | A01N 25/30 |
| 2006/0094602 | A1 * | 5/2006 | Killick | A01N 2300/00 |
| | | | | 504/365 |
| 2017/0181434 | A1 * | 6/2017 | Bhoge | A01N 57/20 |

FOREIGN PATENT DOCUMENTS

| AU | 2005221166 B2 * | 7/2011 | ............. A01N 25/30 |
| AU | 2010221301 B2 * | 3/2015 | ............. A01N 25/30 |
| DE | 3931051 A1 | 3/1990 | |
| WO | WO-0232227 A1 * | 4/2002 | ............. A01N 39/04 |

OTHER PUBLICATIONS

Merriam Webster Online Dictionary defines "derivative". (Year: 2021).*
Wermuth et al. (Drug Discovery Today, 11(7/8), 348-354). (Year: 2006).*
Tyagi et al. (J. Oleo Sci. vol. 55, No. 3, 99-119). (Year: 2006).*
Parker, S. (Ed.); "Aqueous Solution" [Definition]; McGraw-Hill Dictionary of Chemistry; McGraw-Hill, New York; 1997; p. 28, Dec. 1, 1997, McGraw-Hill.

* cited by examiner

*Primary Examiner* — Abigail Vanhorn
*Assistant Examiner* — Ali S Saeed
(74) *Attorney, Agent, or Firm* — CANTOR COLBURN LLP

(57) ABSTRACT

Described herein are aqueous homogeneous herbicide compositions including electrolytic herbicides and a multipart amine component, wherein the multipart amine component includes at least one tertiary amine having an alkyl group of at least 8 carbon atoms.

6 Claims, No Drawings

AQUEOUS HERBICIDAL INTERMIXTURES

CROSS-REFERENCE TO RELATED APPLICATIONS

This application claims priority to Indian Provisional Application 201831019681 filed on May 25, 2018 and U.S. Provisional Application No. 62/728,211, filed on Sep. 7, 2018, which are incorporated herein by reference in their entirety.

TECHNICAL FIELD

The invention relates to herbicidal intermixtures. More particularly, the invention relates to essentially aqueous homogeneous herbicide compositions comprising electrolytic herbicides and a multipart amine component.

BACKGROUND

Controlling unwanted plants is of high importance in agriculture. Over the years, various strategies have been developed for effective control of these unwanted plants. Depending upon the region, it is often necessary to find or develop appropriate techniques for desired weed control. A large part of the surface of the world is arid, characterized as too dry for conventional rain fed agriculture, and hence there is a demand for precise or specific weed control techniques.

"Arid" implies prolonged dryness, and is used with respect to the climate and the land below it. In arid regions, the ability to produce agricultural crops is restricted. Usually on arid lands, the potential evaporation of water from the land exceeds the rainfall. The land may be characterized according to the degree of aridity as dry forest, chaparral or brushland, grassland or savannah, or desert. "Arid" does not adequately characterize the soils, however, for they may vary in many ways. Often soils are alkaline or saline.

An arid ecosystem differs in many respects from one of tropical or temperate zones. Unlike temperate zones, an arid zone is characterized as an area of low precipitation, high temperature, and high rate of evaporation. The frequency of rainfall does not describe accurately the type of the arid zone nor does the amount of precipitation govern the type of vegetation.

Among the various agronomic practices that could bring about immediate positive results in dryland and arid areas, optimum and effective weed control is the first and foremost management practice. However, many weeds growing naturally in arid regions have evolved a more complicated overall drought adaptation strategy which usually involves several mechanisms of drought escape, tolerance and avoidance. The leaf shedding option, the tight stomatal control and the development of a prolific root system are all specific characteristics developed by the vegetation destined to grow in arid regions. The plants adopt osmoregulation and increase elasticity of the plant cell with a decrease in cell size. Due to such natural adaptions of the plants/weeds to the specific conditions, they are tougher than those growing under normal conditions and are difficult to control. Further, such weeds have thick and waxy cuticle layers defending them from the penetration of any use of foliar herbicides. It has been observed that the commonly used non-selective herbicides such as glufosinate-based formulations are not providing an effective weed control in arid regions.

Glufosinate is a non-selective foliage application type herbicide which kills or controls many species of weeds. In the Pesticide Manual 15th Edition, glufosinate has been described as being widely used in burn-down segments, and for control of a wide range of broad-leaved weeds and grasses and sedges in cereals, cotton, corn and soy, fruit orchards, vineyards, rubber and oil palm plantations, ornamental trees and bushes, non-crop land, and pre-emergence in vegetables.

Glufosinate, being a contact herbicide, is known to be used with various adjuvants to improve the efficacy or to induce certain specific properties as required. U.S. Pat. No. 6,642,177 discloses that to be effective, glufosinate must be formulated with a high concentration of surfactants to achieve the required bioefficacy.

DE 3931051 discloses salts of herbicidal acids with long-chain nitrogen bases such as fatty amines.

It has been observed by the inventors that existing formulations of non-selective herbicides such as glufosinate are not as effective as desired particularly in arid environments. In view of such observation, there is a necessity for developing more effective formulations which are physically stable as well as bioefficaceous irrespective of the environment, such as arid, or non-arid regions.

With the forgoing in consideration, the primary object of the present disclosure is the design and preparation of a novel composition of glufosinate which is highly efficacious, particularly in arid regions where the weeds have thick and waxy leaves that are difficult to penetrate with the usual foliar herbicidal formulations.

SUMMARY

In an aspect, an aqueous herbicidal formulation comprises glufosinate and a multi-part amine component. Also included are methods of weed control and/or controlling unwanted plants in arid regions using the composition as well as methods of preparing the compositions.

In an aspect, an herbicidal intermixture comprises
a) an electrolytic herbicide; and
b) a multipart amine component.

In an aspect, an herbicidal intermixture comprises
a) an electrolytic herbicide;
b) a multipart amine component; and
c) water.

In another aspect, an herbicidal intermixture comprises
a) a phosphinic acid herbicide, its salts, its isomers, mixture of isomers, derivatives, or lower alkyl esters thereof;
b) a multipart amine component;
c) optionally other agrochemical excipients; and
d) water.

In another aspect, an aqueous herbicidal composition comprises
(a) a phosphinic acid herbicide, its salts, its isomers, mixture of isomers, derivatives, or lower alkyl esters thereof;
(b) a multipart amine component;
(c) one or more organic solvents;
(d) optionally one or more adjuvants; and
(e) water,
wherein said multipart amine component comprises at least one tertiary amine having an alkyl group of at least 8 carbon atoms.

In another aspect, there is provided a process for preparing herbicidal intermixtures as described herein.

Another aspect is to provide a method of controlling unwanted plants in crop and non-crop areas, said method comprising applying to the plants, unwanted plants or to their locus, an herbicidally effective amount of an herbicidal intermixture according to the present disclosure.

Also provides is a method of controlling unwanted plants in crop and non-crop areas in an arid region, said method comprising applying to the plants, unwanted plants or to their locus in the arid region, an herbicidally effective amount of an herbicidal intermixture as described herein.

DETAILED DESCRIPTION

It has been found that highly efficacious herbicidal compositions comprising glufosinate can be developed by intermixing glufosinate with multipart amine components. In order to overcome the inefficiencies of the existing formulations, particularly in arid regions, the inventors surprisingly found out that herbicidal intermixtures of glufosinate with multipart amine components can be effectively used.

Thus according to an aspect, there is provided an herbicidal intermixture comprising
 a) an electrolytic herbicide; and
 b) a multipart amine component.

In an aspect, the intermixture comprises water.

Provided is an herbicidal intermixture comprising:
 a) an electrolytic herbicide;
 b) a multipart amine component; and
 c) water.

In another aspect, the intermixture possesses superior herbicidal activity compared to prior art formulations.

In an embodiment, the term intermixture includes an admixture.

In certain aspects, the term intermixture includes the mixtures resulting from any one of the processes selected from reaction, solubilisation, neutralization and partial neutralization occurring between the components of the intermixture.

In certain other embodiments, the term intermixture includes a composition or formulation according to the present disclosure.

Accordingly, in certain other aspects, there is provided an herbicidal mixture comprising
 a) an electrolytic herbicide; and
 b) a multipart amine component.

In an aspect, the herbicidal mixture comprises water.

Accordingly, in certain other aspects, there is provided an herbicidal mixture comprising
 a) an electrolytic herbicide;
 b) a multipart amine component; and
 c) water.

In another embodiment, the herbicidal mixture of the present disclosure possesses superior herbicidal activity compared to prior art formulations.

In an aspect, the electrolytic herbicide is a phosphinic acid herbicide.

In some aspects, the phosphinic acid herbicide is selected from glufosinate and glyphosate.

In certain aspects, glufosinate refers to its derivatives selected from lower alkyl esters thereof or salts thereof with acids or bases such as its hydrochloride, monosodium salt, disodium salt, monopotassium salt, dipotassium salt, monocalcium salt, ammonium salt, $-NH_3(CH_3)^+$ salt, $-NH_2(CH_3)_2^+$ salt, $-NH(CH_3)_3^+$ salt, $-NH(CH_3)_2(C_2H_4OH)^+$, $-NH_2(CH_3)(C_2H_4OH)^+$, or its methyl ester, ethyl ester, propyl ester or butyl ester.

In certain other aspects, glufosinate refers to isomers or mixture of isomers.

In a preferred embodiment, the isomer is glufosinate-P.

In some aspects, glyphosate refers to glyphosate-mono ammonium, glyphosate diammonium, glyphosate-isopropylammonium, glyphosate-potassium or glyphosate isopropyl amine salt.

Thus according to another aspect, there is provided an herbicidal intermixture comprising
 a) a phosphinic acid herbicide, its salts, its isomers, mixture of isomers, derivatives, or their lower alkyl esters thereof;
 b) a multipart amine component;
 c) optionally other agrochemical excipients; and
 d) water.

In an aspect, the intermixture possesses superior herbicidal activity compared to prior art formulations.

In an aspect, the multipart amine component comprises one or more tertiary amines having alkyl groups of 8 to 20 carbon atoms. In another aspect, the multipart amine component comprises one or more tertiary dimethyl alkylamines, wherein the alkyl groups have 8 to 20 carbon atoms. In some aspects, the multipart amine component comprises one or more tertiary dimethyl alkylamines, wherein the alkyl groups have 10 to 20 carbon atoms. In an aspect, the multipart amine component comprises at least two tertiary amines having alkyl groups of 8 to 20 carbon atoms. In another aspect, the multipart amine component comprises at least three tertiary amines having alkyl groups of 8 to 20 carbon atoms. In an aspect, the multipart amine component comprises at least four tertiary amines having alkyl groups of 8 to 20 carbon atoms. In an aspect, the multipart amine component comprises at least two tertiary dimethyl alkylamines having alkyl groups of 8 to 20 carbon atoms. In another aspect, the multipart amine component comprises at least three tertiary dimethyl alkylamines having alkyl groups of 8 to 20 carbon atoms. In another aspect, the multipart amine component comprises at least four tertiary dimethyl alkylamines having alkyl groups of 8 to 20 carbon atoms. In another aspect, the multipart amine component comprises at least one tertiary dimethyl alkylamine having alkyl groups of 10 to 18 carbon atoms. In an aspect, the multipart amine component comprises at least two tertiary dimethyl alkylamines having alkyl groups of 8 to 20 carbon atoms wherein said tertiary dimethyl alkylamines are present in a ratio of 1:99 to 99:1. In another aspect, the multipart amine component comprises at least two tertiary dimethyl alkylamines having alkyl groups of 8 to 20 carbon atoms, wherein at least one dimethyl alkylamine is present at least in an amount about 50% by weight of the multipart amine component.

In an aspect, the term intermixture or admixture includes a composition or a formulation.

In an aspect, the composition comprises from about 0.1% to about 60% by weight of phosphinic acid herbicide, based on the total weight of the composition. In a preferred aspect, the composition comprises from about 1% to about 50% by weight of phosphinic acid herbicide, based on the total weight of the composition.

In an aspect, the composition comprises from about 0.1% to about 60% by weight of multipart amine component, based on the total weight of the composition. In a preferred aspect, the composition comprises from about 1% to about 50% by weight of multipart amine component, based on the total weight of the composition.

In an aspect, the composition comprises the phosphinic acid herbicide and multipart amine component in a molar ratio of from about 1:1.5 to about 1.5:1. In a preferred aspect, the composition comprises the phosphinic acid herbicide and multipart amine component in a molar ratio of about 1:1.5. In another preferred aspect, the composition comprises the phosphinic acid herbicide and multipart amine component in an equimolar ratio.

In another aspect, the compositions according to the present disclosure further comprises organic solvents.

Thus accordingly, the present disclosure provides an aqueous herbicidal composition comprising
- a) a phosphinic acid herbicide, its salts, its isomers, mixture of isomers, derivatives, or their lower alkyl esters thereof;
- b) a multipart amine component;
- c) one or more organic solvents;
- d) optionally one or agrochemical excipients; and
- e) water;
  wherein said multipart amine component comprises at least one tertiary amine having an alkyl group of at least 8 carbon atoms.

In an aspect, the solvents are selected from, but are not limited to, a water miscible polar/non-polar or a water immiscible polar/non-polar solvent, for example, alkyl esters of pthalic acid and trimellitic acid; aromatic hydrocarbons such as xylene, Solvesso™-100, Solvesso™-150, Solvesso™-200, alkyl benzenes; methylnaphthalene; mixtures of aromatics aliphatic or cycloaliphatic hydrocarbon such as hexane and heptanes; phthalates; ketones such as cyclohexanone, 2-octanone or acetophenone, methyl isobutyl ketone—saturated or unsaturated cyclic ketones such as isophorone, chlorinated hydrocarbons; vegetable oils and modified vegetable oils; glycols and their derivatives, polyglycols; aliphatic alcohols, alkoxy aliphatic alcohols or mixtures of such two or more solvents. Other solvents can be alkylene carbonates (like propylene carbonate), alkyl amides, and esters such as alkyl esters of monocarboxylic acids and dicarboxylic acid, ester-amides, cyclic ethers such furan and its derivatives or mixtures thereof.

In certain aspects, the herbicidal intermixtures further comprises other agrochemical excipients.

In some embodiments, other agronomically suitable excipients are selected from, but are not limited to, surfactants, solvent, fertilizer, pH modifiers, crystallization inhibitors, viscosity modifiers, suspending agents, spray droplet modifiers, pigments, antioxidants, foaming agents, light-blocking agents, compatibilizing agents, antifoam agents, sequestering agents, neutralizing agents, corrosion inhibitors, dyes, odorants, spreading agents, penetration aids, micronutrients, emollients, lubricants, sticking agents, dispersing agents, thickening agents, freezing point depressants, antimicrobial agents, and the like, and combinations thereof.

In an aspect, the herbicidal intermixture of the present disclosure may be combined with at least another active ingredient such as herbicides, insecticides, fungicides, biological agents, plant growth activators, fertilizers or combinations thereof.

Thus, in an aspect, the herbicidal intermixture according to the present disclosure may be combined with an herbicide. Exemplary herbicides that may be combined with the herbicidal intermixture of the present disclosure include, but are not limited to, herbicides selected from classes such as ACCase inhibitors, ALS inhibitors, EPSP synthase inhibitors, synthetic auxins, auxin transport inhibitors, HPPD inhibitors, lipid synthesis inhibitors, long chain fatty acid inhibitors, as well as herbicides with unknown modes of action.

According to another aspect, the present disclosure further provides a process for preparing herbicidal intermixtures.

In an aspect, the present disclosure provides a process for preparing an herbicidal intermixture, said process comprising
- a) mixing a multipart amine component with water to form a mixture; and
- b) adding an electrolytic herbicide to the mixture to prepare a clear solution.

Thus in an aspect, there is provided a process for preparing an herbicidal intermixture comprising
- a) an electrolytic herbicide; and
- b) a multipart amine component, said process comprising the steps of
  - i. mixing said multipart amine component with water to form a mixture; and
  - ii. adding said electrolytic herbicide to the mixture to prepare a clear solution.

In some aspects, the present disclosure provides a process for preparing herbicidal compositions, said process comprising
- a) mixing a multipart amine component with water;
- b) adding one or more organic solvents to the mixture of a);
- c) optionally adding other agrochemical excipients to the mixture of b); and
- d) intermixing an electrolytic herbicide with the mixture obtained in step c) until a clear solution is obtained.

In certain aspects, the present disclosure provides a process for preparing herbicidal compositions, said process comprising
- a) mixing a multipart amine component with water;
- b) adding one or more organic solvents to the mixture of a);
- c) optionally adding other agrochemical excipients to the mixture of b); and
- d) intermixing a phosphinic acid herbicide, its salts, its isomers, mixture of isomers, derivatives, or their lower alkyl esters thereof with the mixture obtained in step c) until a clear solution is obtained.

In certain aspects, the phosphinic acid herbicide is selected from glufosinate, its salts, its isomers, mixture of isomers, derivatives, or their lower alkyl esters thereof.

Thus in certain aspects, the present disclosure provides a process for preparing herbicidal compositions, said process comprising
- a) mixing a multipart amine component with water;
- b) adding one or more organic solvents to the mixture of a);
- c) optionally adding other agrochemical excipients to the mixture of b); and
- d) intermixing glufosinate, its salts, its isomers, mixture of isomers, derivatives, or their lower alkyl esters thereof with the mixture obtained in step b) or c) until a clear solution is obtained.

In certain other aspects, the present disclosure provides a process for preparing herbicidal comprising
- a) mixing a multipart amine component with water;
- b) adding one or more organic solvents to the mixture of a);
- c) adding other agrochemical excipients selected from the group comprising nonionic surfactants, anionic surfactants, wetting agents and dispersing agents to the mixture of b); and
- d) intermixing glufosinate, its salts, its isomers, mixture of isomers, derivatives, or their lower alkyl esters thereof with the mixture obtained in step c) until a clear solution is obtained.

In certain aspects, the multipart amine component comprises one or more tertiary amines having alkyl groups of 8 to 20 carbon atoms. In certain other aspects, the multipart amine component comprises one or more tertiary dimethyl alkylamines, wherein the alkyl groups have 8 to 20 carbon atoms. In some aspects, the multipart amine component comprises one or more tertiary dimethyl alkylamines, wherein the alkyl groups have 10 to 18 carbon atoms.

The present disclosure further provides a method of controlling unwanted plants in crop and non-crop areas, said method comprising applying to the plants, unwanted plants or to their locus a herbicidally effective amount of compositions according to the present disclosure.

Accordingly, the present disclosure provides a method of controlling unwanted plants in arid regions said method comprising applying to the to the plants, unwanted plants or to their locus a herbicidally effective amount of compositions according to the present disclosure.

In an aspect, the present disclosure provides a method of controlling unwanted plants in both crop and non-crop areas in arid region said method comprising applying to the unwanted plants or to their locus a herbicidally effective amount of compositions according to the present disclosure.

Thus in an aspect, there is provided a weed control method in an arid region, said method comprising applying to weeds or to their locus a herbicidally effective amount of an herbicidal intermixture comprising
a) an electrolytic herbicide;
b) a multipart amine component; and
c) water.

In another aspect, there is provided a weed control method in an arid region, said method comprising applying to weeds or to their locus a herbicidally effective amount of an herbicidal intermixture comprising:
a) a phosphinic acid herbicide, its salts, its isomers, mixture of isomers, derivatives, or their lower alkyl esters thereof;
b) a multipart amine component;
c) optionally other agrochemical excipients; and
d) water.

EXAMPLES

Example 1

An herbicidal intermixture according to the present disclosure comprising glufosinate ammonium was prepared.

| Ingredient | Quantity (% w/w) |
| --- | --- |
| glufosinate ammonium | 25.2 |
| multipart amine ($C_{12}$-$C_{14}$) | 20.0 |
| wetting agent | 15.0 |
| organic solvent | 10.0 |
| ammonium sulfate | 5.0 |
| Water | q.s. |

The composition according to the table was prepared by a process as follows:
The required quantity of multipart amine component, wetting agent, organic solvent, ammonium sulfate and water were combined and mixed until a homogeneous mixture was obtained. The required quantity of glufosinate ammonium was added in portions and mixed vigorously until a clear solution was obtained.

Example 2

A herbicidal intermixture according to the present disclosure comprising glufosinate acid was prepared.

| Ingredient | Quantity (% w/w) |
| --- | --- |
| glufosinate acid | 17.0 |
| multipart amine ($C_{10}$—$C_{14}$) | 20.0 |
| wetting agent | 15.0 |
| organic solvent | 10.0 |
| ammonium sulfate | 5.0 |
| Water | q.s. |

The composition according to the table was prepared by following process given for example 1.

Example 3

An herbicidal intermixture according to the present disclosure comprising glufosinate dipotassium salt was prepared.

| Ingredient | Quantity (% w/w) |
| --- | --- |
| glufosinate dipotassium salt | 30.0 |
| multipart amine ($C_{10}$—$C_{18}$) | 20.0 |
| wetting agent | 15.0 |
| organic solvent | 10.0 |
| ammonium sulfate | 5.0 |
| Water | q.s. |

Example 4

An herbicidal intermixture according to the present disclosure comprising glufosinate acid was prepared.

| Ingredient | Quantity (% w/w) |
| --- | --- |
| glufosinate acid | 17.0 |
| multipart amine ($C_{10}$—$C_{18}$) | 20.0 |
| Wetting agent | 25.0 |
| organic solvent | 10.0 |
| ammonium sulfate | 5.0 |
| water | q.s. |

Example 5

An herbicidal intermixture according to the present disclosure comprising glufosinate ammonium was prepared as follows

| Ingredient | Quantity (% w/w) |
| --- | --- |
| glufosinate ammonium | 15.0 |
| multipart amine ($C_{12}$—$C_{16}$) | 20.0 |
| Wetting agent | 17.0 |
| Alkyl polyglycoside | 10.0 |
| organic solvent | 10.0 |
| ammonium sulfate | 5.0 |
| Water | q.s. |

Example 6

An herbicidal intermixture according to the present disclosure comprising glufosinate acid was prepared as follows:

| Ingredient | Quantity (% w/w) |
| --- | --- |
| glufosinate acid | 17.0 |
| multipart amine ($C_{12}$—$C_{16}$) | 20.0 |
| Sodium lauryl ether sulfate | 16.5 |
| Wetting agent | 8.5 |
| organic solvent | 10.0 |
| ammonium sulfate | 5.0 |
| Water | q.s. |

Example 7

An herbicidal intermixture according to the present disclosure comprising glufosinate ammonium and glyphosate isopropyl amine was prepared as follows:

| Ingredient | Quantity (% w/w) |
| --- | --- |
| glufosinate ammonium | 15.00 |
| glyphosate IPA | 30.00 |
| multipart amine ($C_{12}$—$C_{14}$) | 18.0 |
| wetting agent | 15.0 |
| organic solvent | 10.0 |
| ammonium sulfate | 5.0 |
| Water | q.s. |

Example 8

An herbicidal intermixture according to the present disclosure comprising glufosinate acid and glyphosate isopropyl amine was prepared as follows:

| Ingredient | Quantity (% w/w) |
| --- | --- |
| glufosinate acid | 15.4 |
| glyphosate IPA | 29.0 |
| multipart amine ($C_{12}$—$C_{14}$) | 20.0 |
| wetting agent | 15.0 |
| organic solvent | 10.0 |
| ammonium sulfate | 5.0 |
| Water | q.s. |

Example 9

An herbicidal intermixture according to the present disclosure comprising glufosinate acid and glyphosate isopropyl amine was prepared as follows:

| Ingredient | Quantity (% w/w) |
| --- | --- |
| glufosinate acid | 15.4 |
| glyphosate IPA | 18.5 |
| multipart amine ($C_{10}$—$C_{18}$) | 20.0 |
| wetting agent | 15.0 |
| organic solvent | 10.0 |
| ammonium sulfate | 5.0 |
| Water | q.s. |

Example 10

An herbicidal intermixture according to the present disclosure comprising glufosinate acid and glyphosate isopropyl amine was prepared as follows

| Ingredient | Quantity (% w/w) |
| --- | --- |
| glufosinate acid | 15.4 |
| glyphosate IPA | 29.0 |
| multipart amine ($C_{10}$—$C_{18}$) | 20.0 |
| wetting agent | 15.0 |
| organic solvent | 10.0 |
| ammonium sulfate | 5.0 |
| Water | q.s. |

Example 11

An herbicidal intermixture according to the present disclosure comprising glufosinate acid and glyphosate acid was prepared as follows:

| Ingredient | Quantity (% w/w) |
| --- | --- |
| glufosinate acid | 15.4 |
| glyphosate acid | 15.0 |
| multipart amine ($C_8$—$C_{20}$) | 20.0 |
| wetting agent | 15.0 |
| organic solvent | 10.0 |
| ammonium sulfate | 5.0 |
| Water | q.s. |

Example 12

An herbicidal intermixture according to the present disclosure comprising glufosinate acid and glyphosate acid was prepared as follows:

| Ingredient | Quantity (% w/w) |
| --- | --- |
| glufosinate acid | 15.4 |
| glyphosate acid | 15.0 |
| multipart amine ($C_{10}$—$C_{20}$) | 20.0 |
| wetting agent | 15.0 |
| organic solvent | 10.0 |
| ammonium sulfate | 5.0 |
| Water | q.s. |

Example 13

An herbicidal intermixture according to the present disclosure comprising glufosinate acid and glyphosate acid was prepared as follows:

| Ingredient | Quantity (% w/w) |
| --- | --- |
| glufosinate acid | 15.4 |
| glyphosate acid | 15.0 |
| multipart amine ($C_{10}$—$C_{18}$) | 20.0 |
| wetting agent | 15.0 |
| organic solvent | 10.0 |
| ammonium sulfate | 5.0 |
| Water | q.s. |

Field Trial:

Field trials were carried out in arid regions using the herbicidal intermixtures comprising glufosinate prepared according to the present disclosure as the broad-spectrum herbicide. Two comparative compositions were prepared (in the absence of multipart amine component) and tested along with the inventive compositions to find out the bioefficacy. The details of the compositions are as given below:

Example 14

An herbicidal intermixture according to the present disclosure comprising glufosinate acid was prepared as follows:

| Ingredient | Quantity (% w/w) |
|---|---|
| Glufosinate acid | 17.0 |
| multipart amine ($C_{10}$—$C_{14}$) | 20.0 |
| Syngergen GA | 12.0 |
| Synergen PFA | 6.0 |
| 1-methoxy-2-propanol | 6.0 |
| propylene glycol | 8.0 |
| ammonium sulfate | 5.0 |
| Water | QS |

SYNERGAN® GA is a glucamide commercially available from Clariant and SYNERGAN® PEA is polyalkylene ether sulfate ammonium commercially available from Clariant.

Comparative Example (Example 15)

A composition of glufosinate acid (in the absence of multipart amine component) was prepared as follows:

| Ingredient | Quantity (% w/w) |
|---|---|
| Glufosinate acid | 17.0 |
| Syngergen GA | 17.0 |
| Synergen PFA | 10.0 |
| 1-methoxy-2-propanol | 10.0 |
| ammonium sulfate | 5.0 |
| Propylene glycol | 14.0 |
| Water | QS |

Comparative Example (Example 16)

A composition of glufosinate salt (in the absence of multipart amine component) was prepared as follows:

| Ingredient | Quantity (% w/w) |
|---|---|
| Glufosinate ammonium | 25.2 |
| Synergen GA | 17.0 |
| Synergen PFA | 10.0 |
| 1-methoxy-2-propanol | 10.0 |
| ammonium sulfate | 5.0 |
| Propylene glycol | 14 |
| Water | QS |

The compositions were diluted with water and applied to broad leaf weeds, grasses and sedges in the arid region.

After treatment using the composition (Example 14) prepared according to the present disclosure, chlorosis followed by necrosis of the weeds were observed demonstrating the bioefficacy of the new compositions. Comparative compositions (Example 15 and Example 16) and a market sample of glufosinate ammonium (Liberty® 280 SL Glufosinate ammonium) were also tested to compare the results. The observations at 7 days, 14 days and 21 days after application were summarized in below table (table 1).

TABLE 1

| | | % weed control | | | | | |
|---|---|---|---|---|---|---|---|
| | | % weed control (Palmer Amaranth) | | | % weed control (Kochia) | | |
| Treatment | Rate of application | 7 days | 14 days | 21 days | 7 days | 14 days | 21 days |
| Example 14 | 0.61 lb/A | 36.7 | 83.3 | 90.0 | 43.3 | 86.7 | 90.0 |
| Example 14 | 0.835 lb/A | 43.3 | 90.0 | 90.0 | 46.7 | 90.0 | 90.0 |
| Market sample | 0.73 lb/A | 26.7 | 63.3 | 53.3 | 30.0 | 56.7 | 56.7 |
| Example 15 | 0.61 lb/A | 22.4 | 45.7 | 30.3 | 21.1 | 37.4 | 26.5 |
| Example 15 | 0.835 lb/A | 25.7 | 50.3 | 34.6 | 23.5 | 40.2 | 31.8 |
| Example 16 | 0.61 lb/A | 25.3 | 51.2 | 37.8 | 24.3 | 45.6 | 36.5 |
| Example 16 | 0.835 lb/A | 28.2 | 58.3 | 51.1 | 27.5 | 48.7 | 39.2 |

The field-testing results as shown in the above table evidently reveal that the compositions according to the present disclosure are extremely effective for weed control in arid regions. It has been noted that due to natural adaption of the weeds to the arid conditions, they are tougher than those growing under normal conditions and are generally difficult to control. Further, these weeds displayed thick and waxy cuticle layers defending them from the penetration of the herbicide spray. It has been noted that the commonly used glufosinate based formulations and market sample of glufosinate were not providing an effective weed control in arid regions. The inventive compositions even at a low rate were found to be highly efficacious in controlling tough weeds in the arid area.

The instant invention is more specifically explained by above examples. However, it should be understood that the scope of the present invention is not limited by the examples in any manner. It will be appreciated by any person skilled in this art that the present invention includes aforesaid examples and further can be modified and altered within the technical scope of the present invention.

The use of the terms "a" and "an" and "the" and similar referents (especially in the context of the following claims) are to be construed to cover both the singular and the plural, unless otherwise indicated herein or clearly contradicted by context. The terms first, second etc. as used herein are not meant to denote any particular ordering, but simply for convenience to denote a plurality of, for example, layers. The terms "comprising", "having", "including", and "containing" are to be construed as open-ended terms (i.e., meaning "including, but not limited to") unless otherwise noted. Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

The invention claimed is:

1. An aqueous herbicidal intermixture comprising
   a) an active herbicide ingredient consisting of glufosinate or a salt, isomer, mixture of isomers, or lower alkyl ester thereof;
   b) a multipart amine component, wherein said multipart amine component comprises at least two tertiary dimethyl alkylamines having alkyl groups of 8 to 20 carbon atoms, and
   c) water in an amount greater than about 5% by weight based on a total weight of the aqueous herbicidal intermixture,
   wherein the glufosinate or a salt, isomer, mixture of isomers, or lower alkyl ester thereof and the multipart amine component in a molar ratio of from about 1:1.5 to about 1.5:1.

2. The aqueous herbicidal composition of claim 1, further comprising (d) one or more organic solvents; and
   (e) a wetting agent.

3. A process for preparing an aqueous herbicidal intermixture according to claim 1, comprising
   a. mixing said multipart amine component with water; and
   b. adding said active herbicide ingredient to the mixture to prepare a clear solution.

4. The process for preparing the aqueous herbicidal intermixture according to claim 3, wherein the process further comprises adding one or more organic solvents to the mixture of step a); and optionally adding other agrochemical excipients.

5. A method controlling unwanted plants in crop and non-crop areas, said method comprising applying to plants, unwanted plants or to their locus, a herbicidally effective amount of the aqueous herbicidal intermixture of claim 1.

6. A method of controlling unwanted plants in crop and non-crop areas in an arid region, said method comprising applying to plants, unwanted plants or to their locus in an arid region, an herbicidally effective amount of the aqueous herbicidal intermixture of claim 1.

* * * * *